(12) United States Patent
Zumdome

(10) Patent No.: US 9,426,939 B2
(45) Date of Patent: Aug. 30, 2016

(54) VIBRATIONAL SEED-DOUBLE ELIMINATOR FOR A PLANTING UNIT

(71) Applicant: Deere & Company, Moline, IL (US)

(72) Inventor: Lee E. Zumdome, Bettendorf, IA (US)

(73) Assignee: Deere & Company, Moline, IL (US)

(*) Notice: Subject to any disclaimer, the term of this patent is extended or adjusted under 35 U.S.C. 154(b) by 48 days.

(21) Appl. No.: 14/170,334

(22) Filed: Jan. 31, 2014

(65) Prior Publication Data

US 2015/0216114 A1 Aug. 6, 2015

(51) Int. Cl.
*A01C 7/04* (2006.01)
*A01C 7/20* (2006.01)

(52) U.S. Cl.
CPC *A01C 7/046* (2013.01); *A01C 7/20* (2013.01)

(58) Field of Classification Search
CPC ............ A01C 7/04; A01C 7/00; A01C 7/20; A01C 7/046
See application file for complete search history.

(56) References Cited

U.S. PATENT DOCUMENTS

| | | |
|---|---|---|
| 4,162,744 A | 7/1979 | Barker et al. |
| 5,170,909 A | 12/1992 | Lundie et al. |
| 5,842,428 A | 12/1998 | Stufflebeam et al. |
| 6,273,010 B1 | 8/2001 | Luxon |
| 6,352,042 B1 | 3/2002 | Martin et al. |
| 7,093,548 B2 | 8/2006 | Eben et al. |
| 7,152,542 B2 | 12/2006 | Eben et al. |
| 7,162,963 B2 | 1/2007 | Sauder et al. |
| 7,699,009 B2 | 4/2010 | Sauder et al. |
| 7,798,080 B2 | 9/2010 | Sauder et al. |
| 8,746,159 B2 | 6/2014 | Garner et al. |
| 2012/0067260 A1 | 3/2012 | Garner et al. |

FOREIGN PATENT DOCUMENTS

WO 2010059101 A1 5/2010

OTHER PUBLICATIONS

European Search Report for Related Application No. EP15152472, Dated Jun. 18, 2015.

*Primary Examiner* — Christopher J Novosad
(74) *Attorney, Agent, or Firm* — Ingrassia, Fisher & Lorenz, P.C.

(57) ABSTRACT

A vibrational seed-double eliminator ("VSDE") for a seeding machine that moves seed along a seed path from a seed pool to a release position and a related planting unit are described. The VSDE may include a vibration strip extending along the seed path along the seed pool. As the seed is moved by the seeding machine along the seed path, the vibration strip may cause the seed to vibrate, thereby removing from the seed path one or more seeds from a seed double. The vibration strip may include a plurality of protrusions extending into the seed path, including rounded, cylindrical or other protrusions. The vibration strip may include various parallel ridges extending into the seed path, or a various recesses extending into the vibration strip and away from the seed path. An automated vibration device may impart vibrational motion to the vibration strip.

20 Claims, 12 Drawing Sheets

VIBRATIONAL SEED-DOUBLE ELIMINATOR FOR A PLANTING UNIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The following relates to planting units for a seeding machine or planter, including planting units having seed meters.

BACKGROUND OF THE DISCLOSURE

Various types of seed meters have been developed that use an air pressure differential, either vacuum or positive pressure, to adhere seed to a metering member. The metering member takes seed from a seed pool and sequentially discharges single seeds. (In some cases, multiple seeds may be discharged at a time.) One common type of seed meter is shown in U.S. Pat. No. 5,170,909. There, a seed disk contained in a housing is used to meter the seed. A seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk.

In this and other configurations of seed meters (and other seed transport devices), it may be useful to provide various mechanisms to assist in eliminating seed doubles. A seed double may occur, for example, when two (or more) seeds are captured by a single portion of a seed meter (e.g., a vacuum aperture oriented between two paddles of a seed meter) or another device for transport of seeds between locations (e.g., between a seed pool and a release position for the seed). Because it may be desirable to plant (or otherwise process) seeds individually and sequentially, it may be useful to provide an apparatus that assists in eliminating seed doubles.

SUMMARY OF THE DISCLOSURE

A vibrational seed-double eliminator and associated planting unit are disclosed, for assisting in removing seed doubles from a seed meter of a planter or other apparatus.

According to one aspect of the disclosure, a seeding machine is configured to move seed along a seed path from a seed pool to a release position. A vibrational seed-double eliminator of the seeding machine includes a vibration strip extending along the seed path along the seed pool. As the seed is moved by the seeding machine along the seed path, the vibration strip causes the seed to vibrate, thereby removing one or more seed doubles from the seed path. The vibration strip may be fixed with respect to the seed path and may include a plurality of protrusions extending into the seed path, including rounded, cylindrical or other protrusions. The vibration strip may include a series of parallel ridges extending into the seed path, or a plurality of recesses extending into the vibration strip and away from the seed path. An automated vibration device in communication with the vibration strip may impart vibrational motion to the vibration strip.

According to another aspect of the disclosure, a planting unit includes a seed meter with a metering member for moving seed individually and sequentially along a seed path from a seed pool to a release position. The planting unit also includes a vibration strip extending along the seed path along the seed pool, the vibration strip including a seed-contact portion adjacent to the metering member and the seed path. As the seed is moved by the metering member along the seed path, contact between the seed-contact portion of the vibration strip and the seed causes the seed to vibrate, thereby removing one or more seed doubles from the seed path. The seed-contact portion may include a plurality of protrusions extending into the seed path, including rounded, cylindrical or other protrusions. The seed-contact portion may include a series of parallel ridges extending into the seed path, or a plurality of recesses extending into the vibration strip and away from the seed path. An automated vibration device in communication with the vibration strip may impart vibrational motion to the vibration strip.

BRIEF DESCRIPTION OF THE DRAWINGS

Like reference symbols in the various drawings indicate like elements.

DETAILED DESCRIPTION

The following describes one or more example embodiments of the disclosed vibrational seed-double eliminator and planting unit, as shown in the accompanying figures of the drawings described briefly above. Various modifications to the example embodiments may be contemplated by one of skill in the art.

As also noted above, it may be useful to provide a planting unit (e.g., a seeding machine or associated planter) that includes an apparatus to eliminate seed doubles. For example, a planting unit may include a metering member that moves seeds along a generally circular (or other) seed path from a seed pool to an elevated (or other) release position. In certain embodiments, the planting unit may include additional mechanisms for further transport or processing of such seeds after the seeds are released from the metering member at the release position. It may be useful, in certain embodiments, to provide a seed-double eliminator to remove various seed doubles that may be present in the metering member (or other mechanism engaged in transporting seeds) before the release position (or at other times or locations). (It will be understood that "double," as used herein, may refer to any grouping of multiple seeds, including groupings of three or more seeds.)

In certain embodiments, a vibrational seed-double eliminator ("VSDE") may be provided, with a vibration strip extending along the seed path. Such a vibration strip, for example, may extend along (and, in certain embodiments, beyond) a seed pool from which a metering member (or other mechanism) draws seed for transport along the seed path. As the seed is transported by the metering member (or other mechanism) the seed may be carried along the vibration strip, with the contact between the seed and the vibration strip causing the seed to vibrate. Because seed doubles may be less firmly secured to the metering member (or other seed transport mechanism) than single seeds, this vibration may tend to cause at least one seed of various seed doubles to be released from the metering member (i.e., may eliminate seed doubles along the seed path) while tending not to cause single seeds to be released from the metering member (and thereby removed from the seed path). In this way, the vibration strip may assist in eliminating various seed doubles from the metering member (or other mechanism) before the seeds are planted or otherwise processed.

As used herein, "vibrate" or "vibration" may indicate random or other bouncing, shaking, or jittering, or random, cyclical or other imparted deviation from a nominal position or course of travel. For example, a seed traveling along a seed path may be said to vibrate if the seed is induced to move in a bouncing, shaking, jittering, or other motion that causes the seed to deviate from its nominal course of travel along the seed path. Likewise, a component that is normally fixed in a nominal position may be said to vibrate if the component is induced to move in a bouncing, shaking, jittering, or other motion that departs (e.g., randomly or cyclically) from the nominal position.

A VSDE may be configured in a variety of ways. In certain embodiments, a vibration strip included in a VSDE may include various protrusions, ridges, recesses, grids, or other geometry, which may define seed-contacting features configured as spaced-apart surfaces adjacent to the seed path that cause the seed to vibrate as the seed moves along the vibration strip. In certain embodiments, a VSDE may include an automated vibration device (e.g., a motor or automated actuator) in communication with the vibration strip. The automated vibration device may be activated to impart vibrational motion to a portion of the vibration strip as the seed is moved by the seeding machine along the seed path (and the vibration strip). As noted above, such vibration may assist in removing various seed doubles from the seed path.

Figure 1:
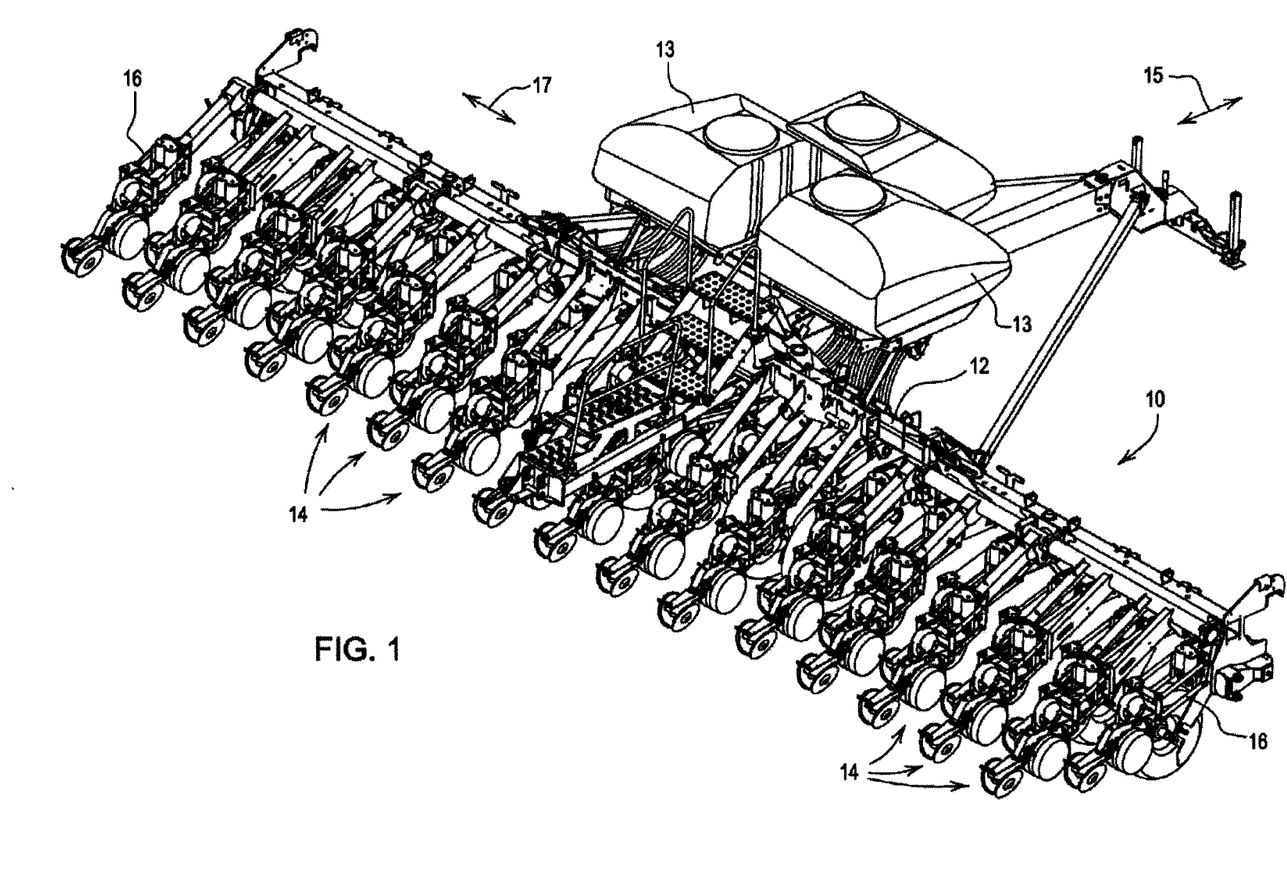
FIG. 1 is a perspective view of a common agricultural planter.

Referring now to FIG. 1, example agricultural seeding machine 10 is shown as a row crop planter. It will be understood that various other configurations may also be possible and that the disclosed vibrational seed-double eliminator (and planter) may be used in a variety of agricultural or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
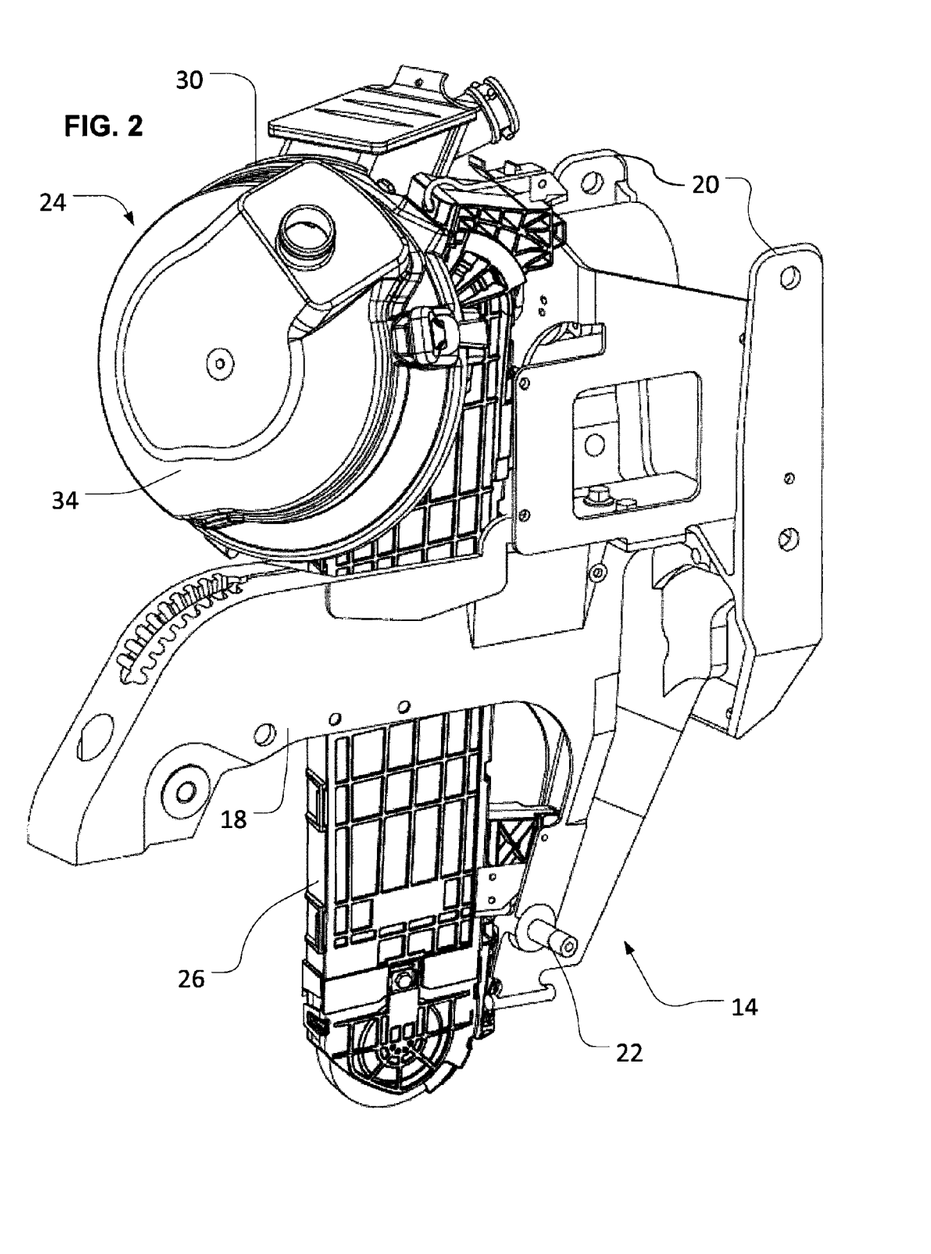
FIG. 2 is a side perspective view of a planting unit frame, seed meter and seed delivery system.

Referring also to FIG. 2, each planting unit 14 may be mounted, in various known ways, to frame member 18. (It will be understood that the disclosed VSDE may be utilized with planting unit 14, or with various other seed-handling devices (not shown).) Frame member 18 may include a pair of upstanding arms 20 at the forward end thereof. Arms 20 may be coupled to the rearward ends of parallel linkage 16. Furrow opening disks (not shown) may be attached to shaft 22 in a known manner to form an open furrow in the soil beneath the seeding machine into which seed is deposited. Closing and packing wheels (not shown) may also be mounted to frame member 18 in a known manner to close the furrow over the deposited seed and to firm the soil in the closed furrow. Seed meter 24 and seed delivery system 26 (depicted without a cover in FIG. 2) may also be attached to the frame member 18 of the planting unit.

Figure 3:
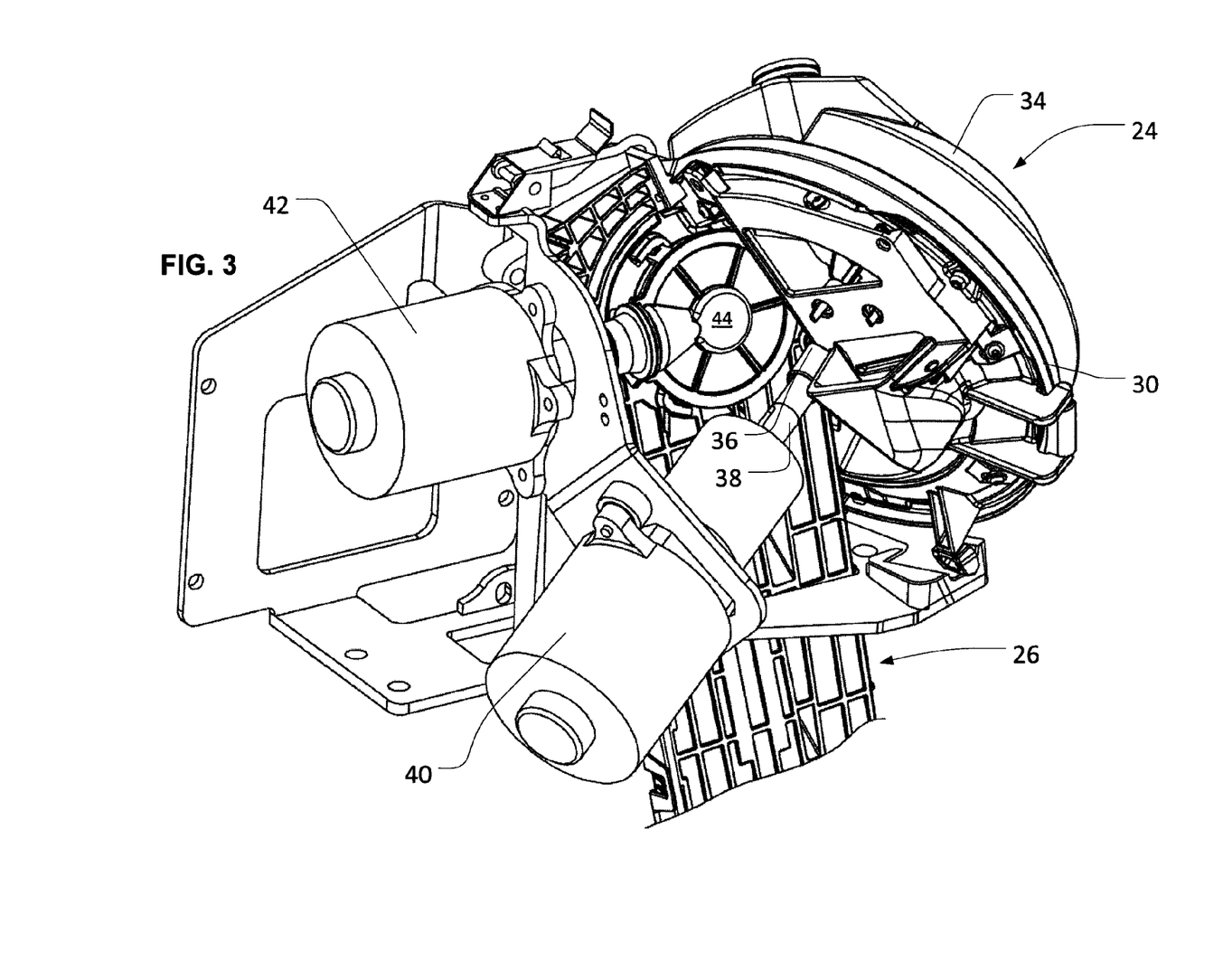
FIG. 3 is an enlarged perspective view of the seed meter and delivery system drives.
Figure 4:
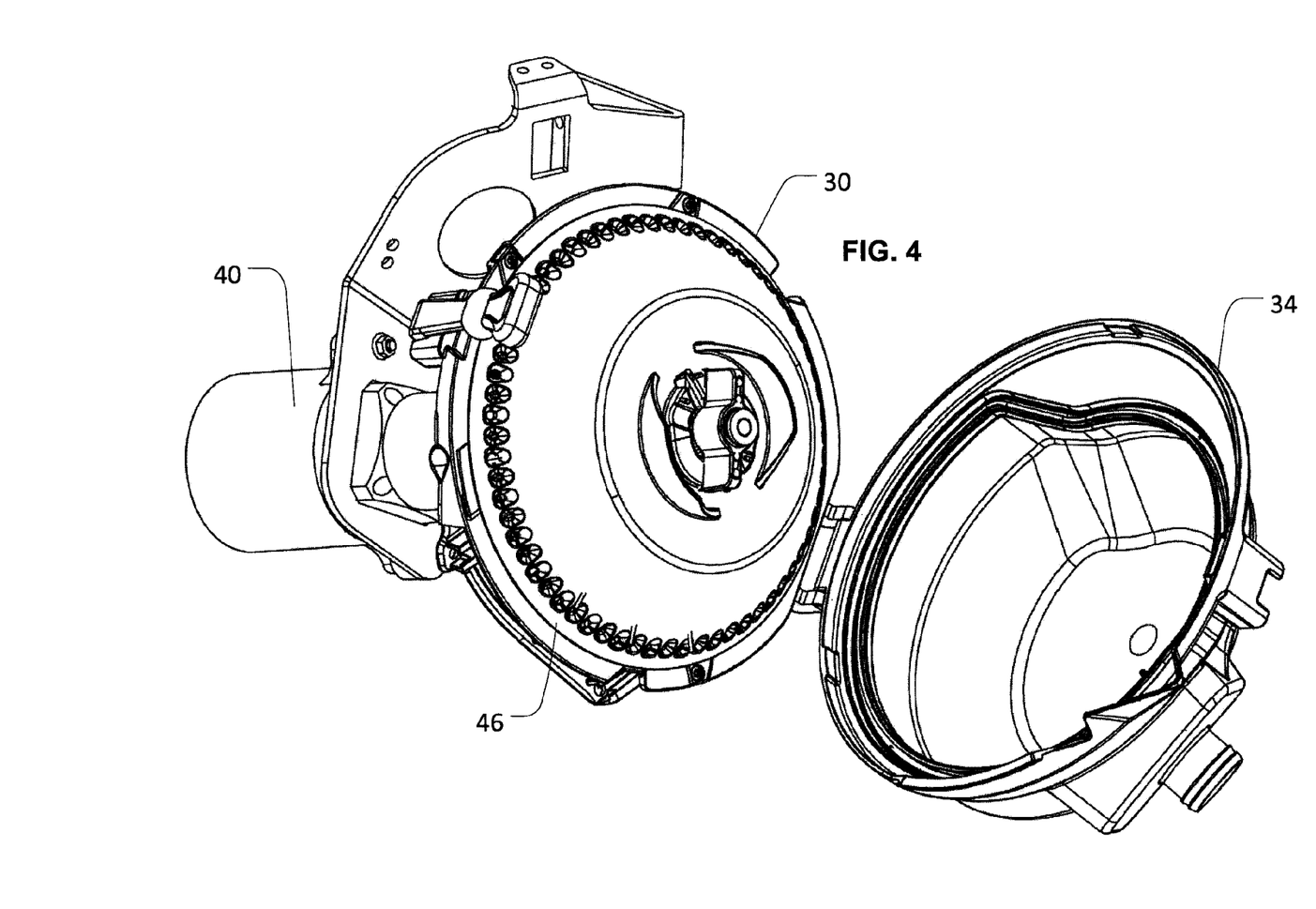
FIG. 4 is a perspective view of the seed meter with the cover open to show a metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle 36 may be carried by the housing 30 and may be couple to output shaft 38 of electric motor 40, in order to drive the seed meter when in the assembled position shown in FIG.

Delivery system 26 may be driven by electric motor 42. The output shaft of motor 42 may be connected to delivery system 26 through right-angle drive 44. While electric motors have been shown to drive both the seed meter and the seed delivery system, it will be appreciated by those skilled in the art that other types of motors, such as hydraulic, pneumatic, etc. can be used as well as various types of mechanical drive systems.

Figure 5:
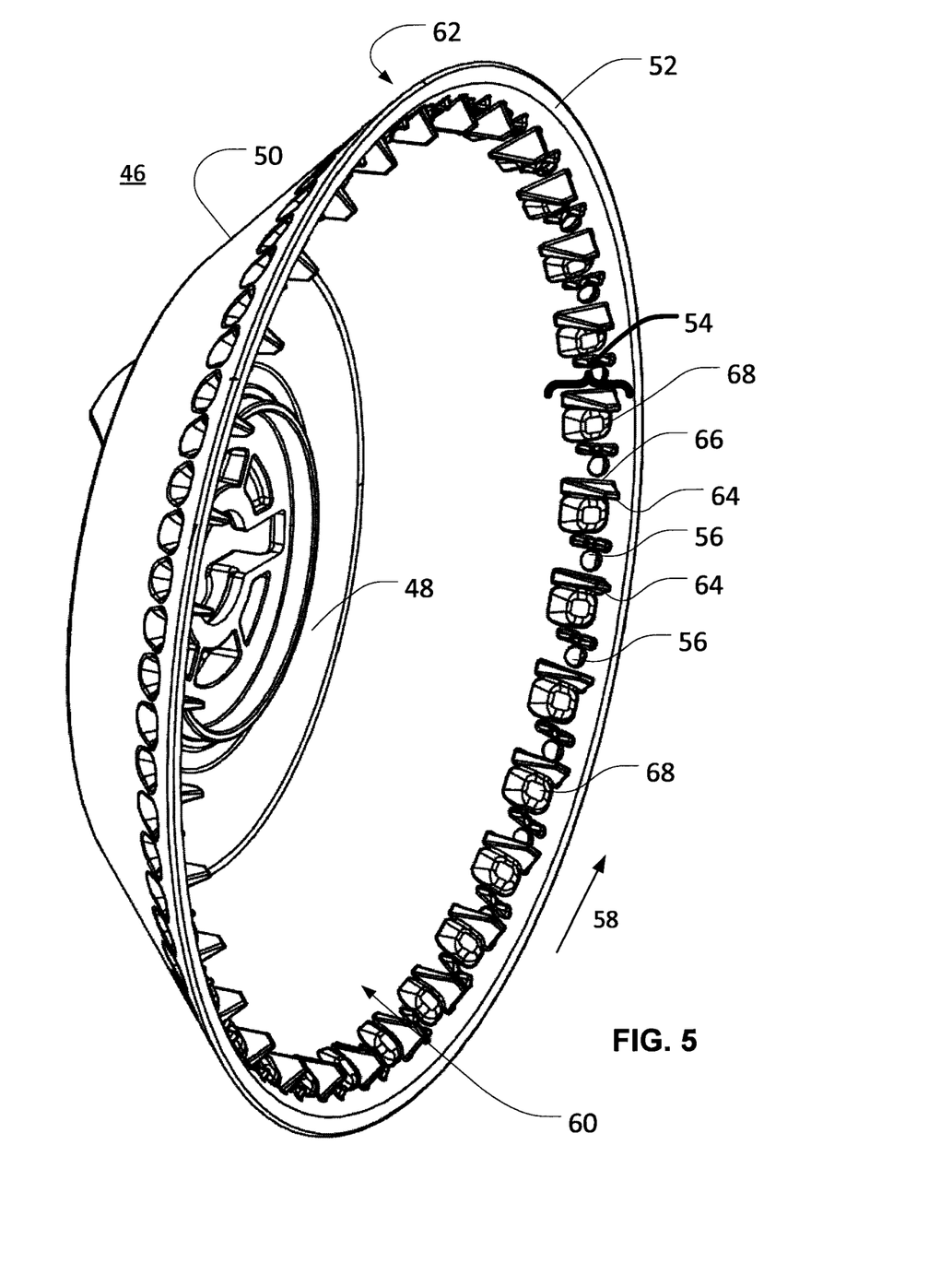
FIG. 5 is a perspective view of the metering member included in the seed meter of FIG. 4.
Figure 6:
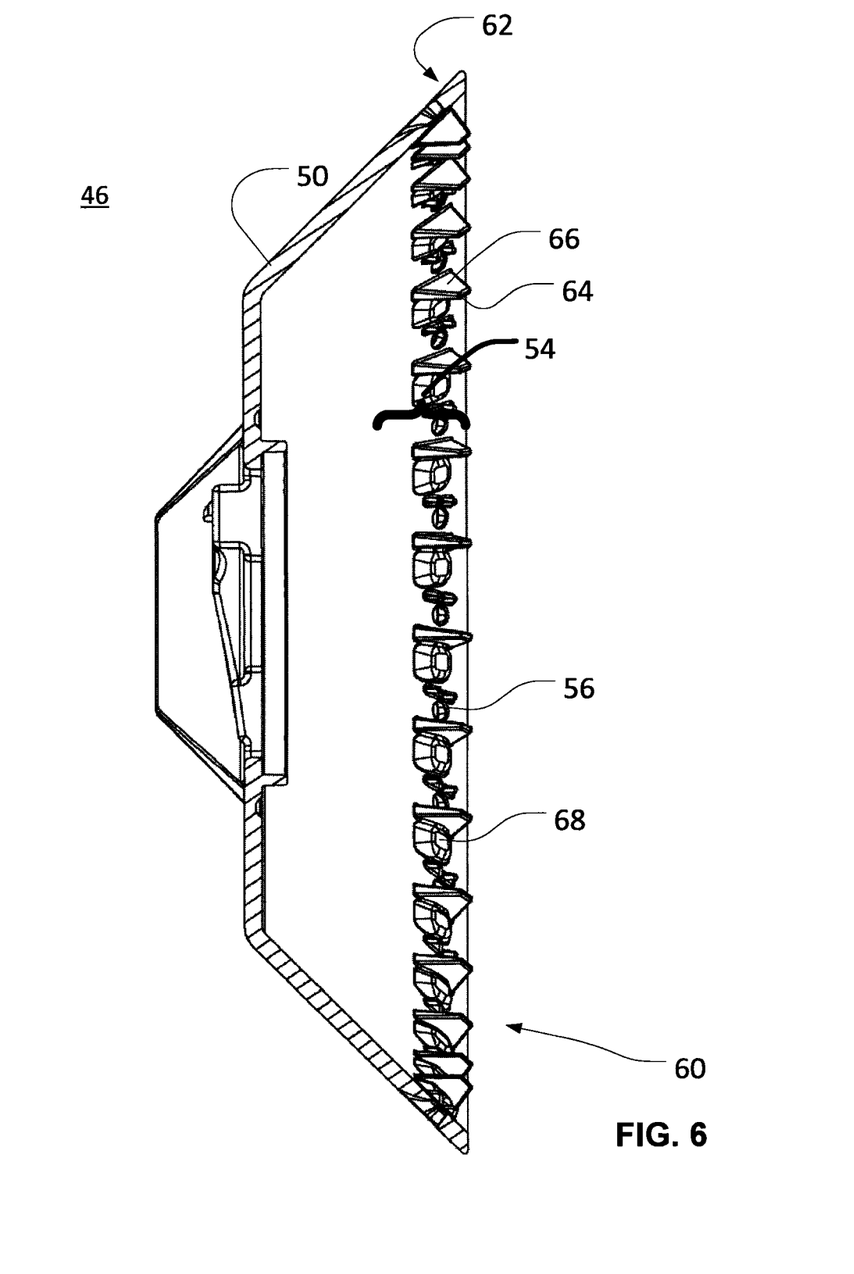
FIG. 6 is side cross-section of the metering member of FIG. 5.

Referring also to FIGS. 5 and 6, metering member 46 of seed meter 24 is shown in greater detail. Metering member 46 may include (as shown) a concave bowl-shaped body. The bowl-shaped body may have a base portion 48 from which extends side wall 50. Side wall 50 may terminate in an outer edge 52. Adjacent outer edge 52, side wall 50 may include rim portion 54, as indicated by bracket in FIGS. 5 and 6, which may extend radially outwardly and axially toward outer edge 52. Within rim portion 54, an annular array of apertures 56 may extend between the inner and outer surfaces of side wall 50.

Metering member 46 may be mounted in meter housing 30 for rotation in the direction of arrow 58 in FIG. 5. In operation, as the metering member rotates, individual seeds from seed pool 60 (see also, e.g., FIG. 8A) located at a bottom portion of metering member 46 may adhere to apertures 56 on the inner surface of side wall 50 and thereby be sequentially carried upward along a seed path to release position 62, at an upper portion of metering member 46. A series of raised features or projections, such as paddles 64, may extend from the inner surface of side wall 50. In certain embodiments, one paddle 64 may be located behind each aperture 56, with respect to direction of rotation 58. Each paddle 64 may, accordingly, form a confronting surface 66 behind an associated aperture to push a seed adhered to the aperture along the seed path. In certain embodiments, metering member 46, as installed in housing 30, may be oriented at an angle from vertical (not shown in FIG. 6).

In certain embodiments, metering member 46 may include raised geometry 68 between sets of paddles 64. In operation, such geometry 68 may sometimes serve to orient individual seeds in a seed double for better removal by a VSDE. For example, with a seed double being carried between a set of paddles 64, geometry 68 may tend to cause one seed of the seed double to seat at or near the associated aperture 56 (and thereby be more firmly retained on metering member 46), while orienting the other seed (or seeds) away from aperture 56 (and the seed seated at or near it).

A metering member (or other seed transport device) may be formed as one piece or constructed of multiple pieces, and may differ in various ways from example metering member 46 depicted in the various figures herein. It will be understood, accordingly, that the disclosed VSDE may be used with a metering member such as metering member 46, or with various other metering members or other types of seed transport devices.

As noted above, seed pool 60 may formed at the bottom of metering member 46. Vacuum may be applied to the outer surface of side wall 50, causing individual seeds to be adhered to various apertures 56 as the apertures travel through the seed pool. As metering member 46 rotates as shown by arrow 58, seed may thereby be moved upward to release position 62 at the upper portion of metering member 46. Release position 62 may be slightly past the top or 12 o'clock position on the circular path of travel of the seed such that the seed is moving somewhat downward at the release position. Seed delivery system 26 may be positioned beneath the upper portion of metering member 46 at the release position 62 to take the seed from the metering member (e.g., as shown in FIGS. 7 and 8A).

Figure 7:
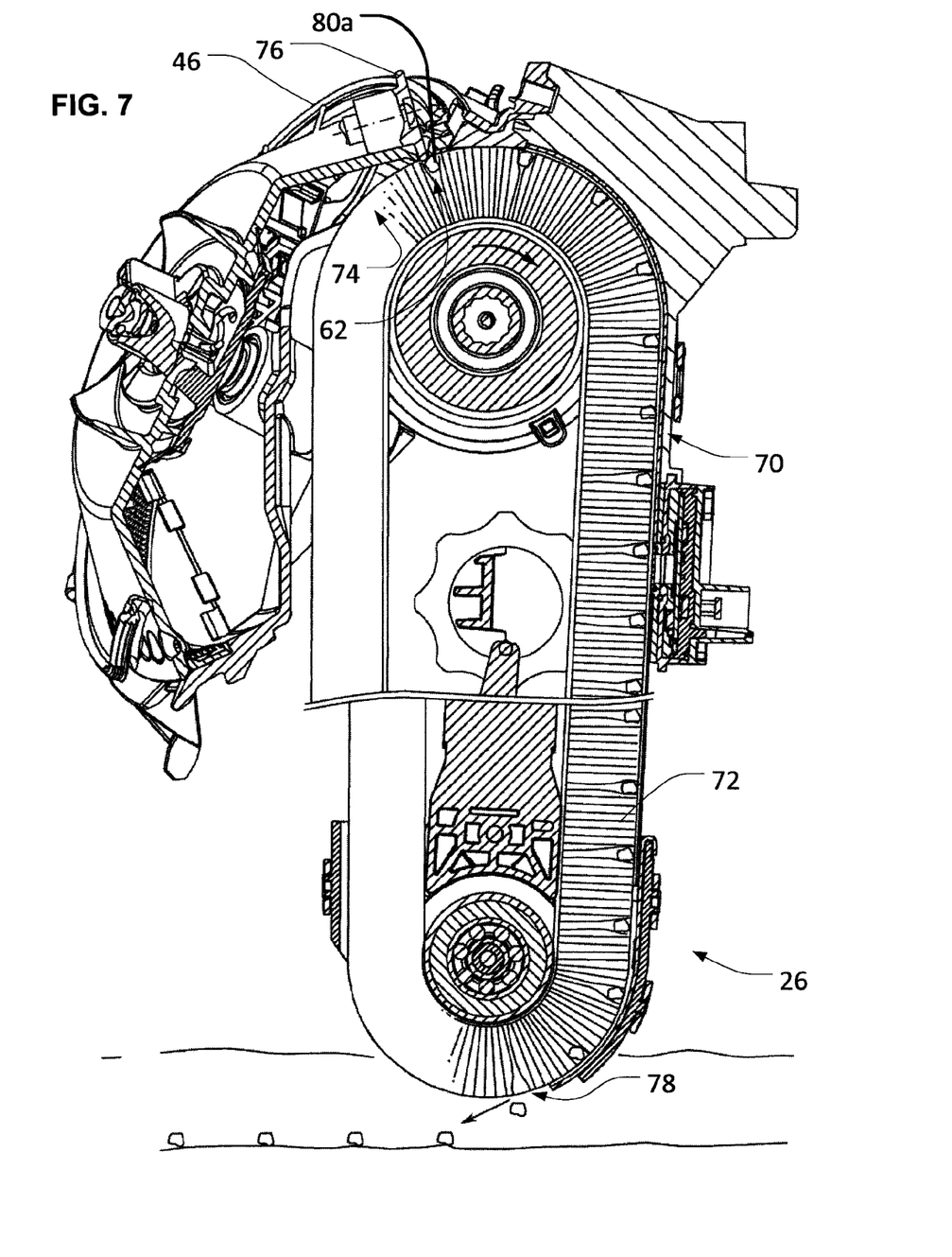
FIG. 7 is a side sectional view of aspects of one embodiment of the seed meter and seed delivery system.
Figure 8A:
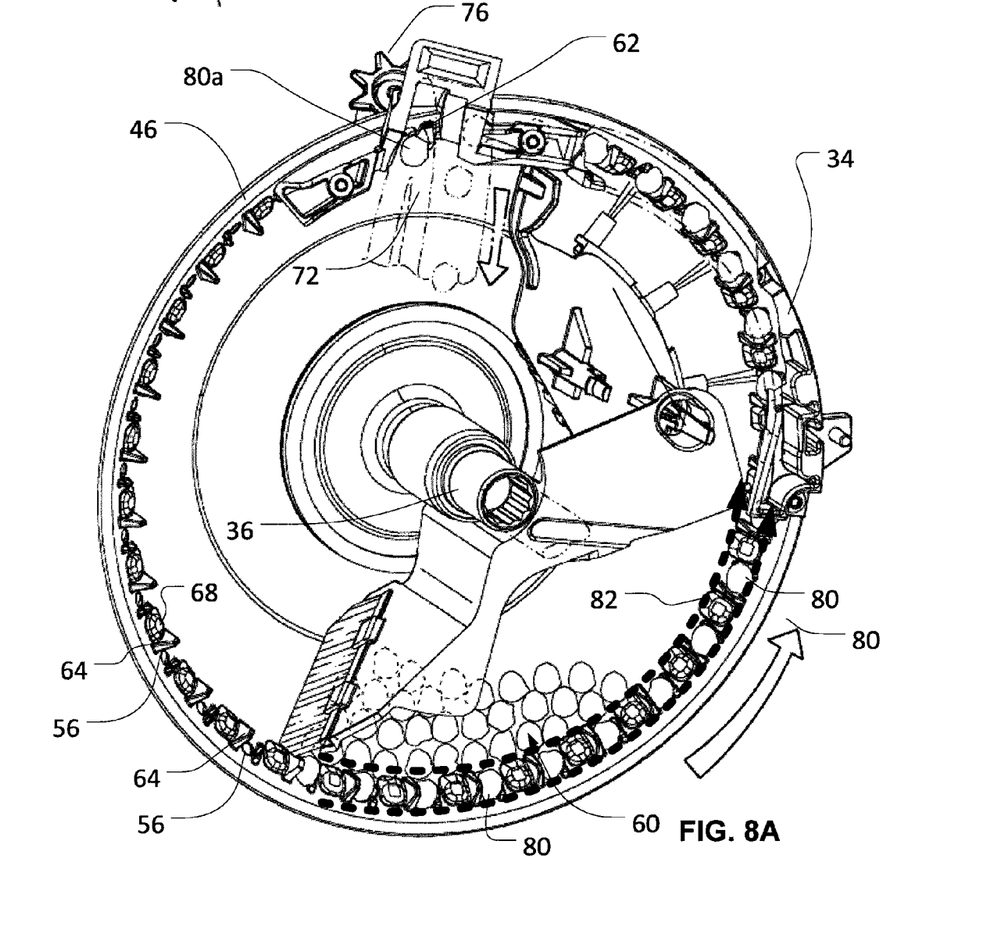
FIG. 8 is a perspective view of certain internal components of the seed meter of FIG. 4.

Referring also to FIGS. 7 and 8A, delivery system 26 may include housing 70 partially enclosing bristles 72, which may generally travel in a clockwise direction (in FIG. 7) within housing 70. Upper opening 74 may be formed in housing 70 in order to allow seed to enter housing 70 (e.g., from metering member 46). Bristles 72 may extend through opening 74 in order to receive seed from metering member 46. (It will be understood that other configurations may also be possible. For example, delivery system 26 may be oriented horizontally, rather than vertically, or at various deviations from horizontal or vertical. As such, in a general sense, opening 74 may be viewed as an inlet opening to delivery system 26.)

Ejector 76 may ride on the outer surface of metering member 46, with projections from a star wheel on ejector 76 extending, sequentially, into apertures 56 in order to force seed out of apertures 56. Ejector 76, which may be biased against metering member 46 with a spring (not shown) may, accordingly, "walk" along metering member 46 such that successive projections of the star wheel sequentially eject seeds, at release position 62, from successive apertures 56. These ejected seeds may be captured by rotating bristles 72 (e.g., as depicted for seed 80a) and thereby carried to seed ejection point 78.

As noted above, metering member 46 may be intended to carry seeds individually and sequentially between seed pool 60 and release position 62 (e.g., to carry a single seed between each pair of paddles 64, secured by vacuum through the associated aperture 56). In various instances, however, multiple seeds from seed pool 60 may become lodged between a pair of paddles 64. As noted above, this may be referred to as a "seed double" (although, in various instances, more than two seeds may be included).

Figure 8B:
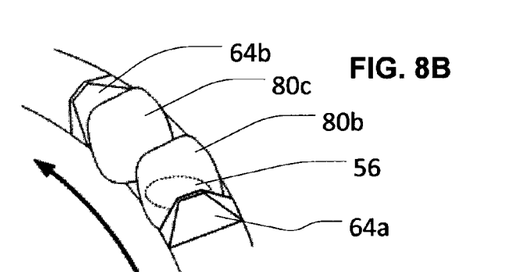

It will be understood that various configurations of seed doubles may occur. For example, as depicted in FIG. 8B, upstream seed 80b of a seed double may be oriented over aperture 56 and against upstream paddle 64a, and downstream seed 80c may be oriented against downstream paddle 64b.

Still referring to FIG. 8A, metering member 46 may carry various seeds (e.g., seeds 80) along seed path 82 (e.g., a generally circular path along rim portion 54 of metering member 46, as indicated in FIG. 8A by dashed lines), which may generally extend from seed pool 60 to release position 62 in a counter-clockwise direction (as depicted in FIG. 8A). In certain embodiments, a VSDE (not shown in FIG. 8A) may be usefully located along seed path 82. In certain embodiments, a VSDE may extend, at least in part, along seed pool 60. (It will be understood that the boundaries of seed path 82 may be indicated only approximately in the various figures, and that in various instances and embodiments seeds 80 may be carried in the direction of path 82 wholly, partially, or not at all between the arrows representing path 82 in the figures.)

Figure 9:
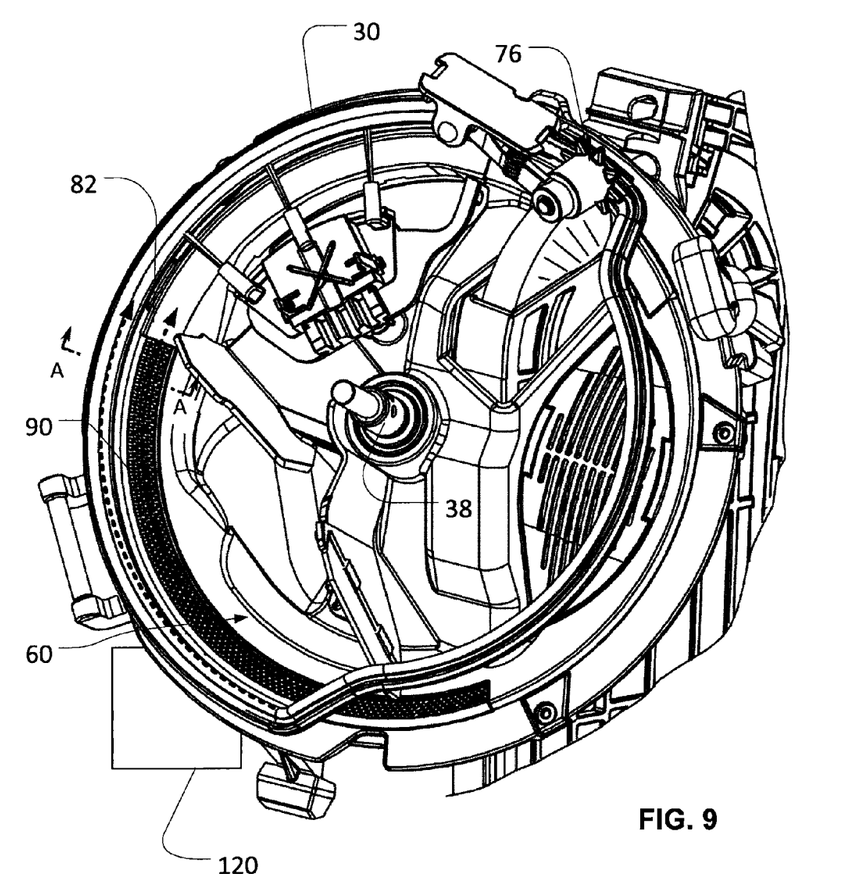
FIG. 9 is a perspective is a certain internal components of the seed meter of FIG. 4, including a vibration strip, taken from an generally opposite perspective as FIG. 8.
Figure 10:
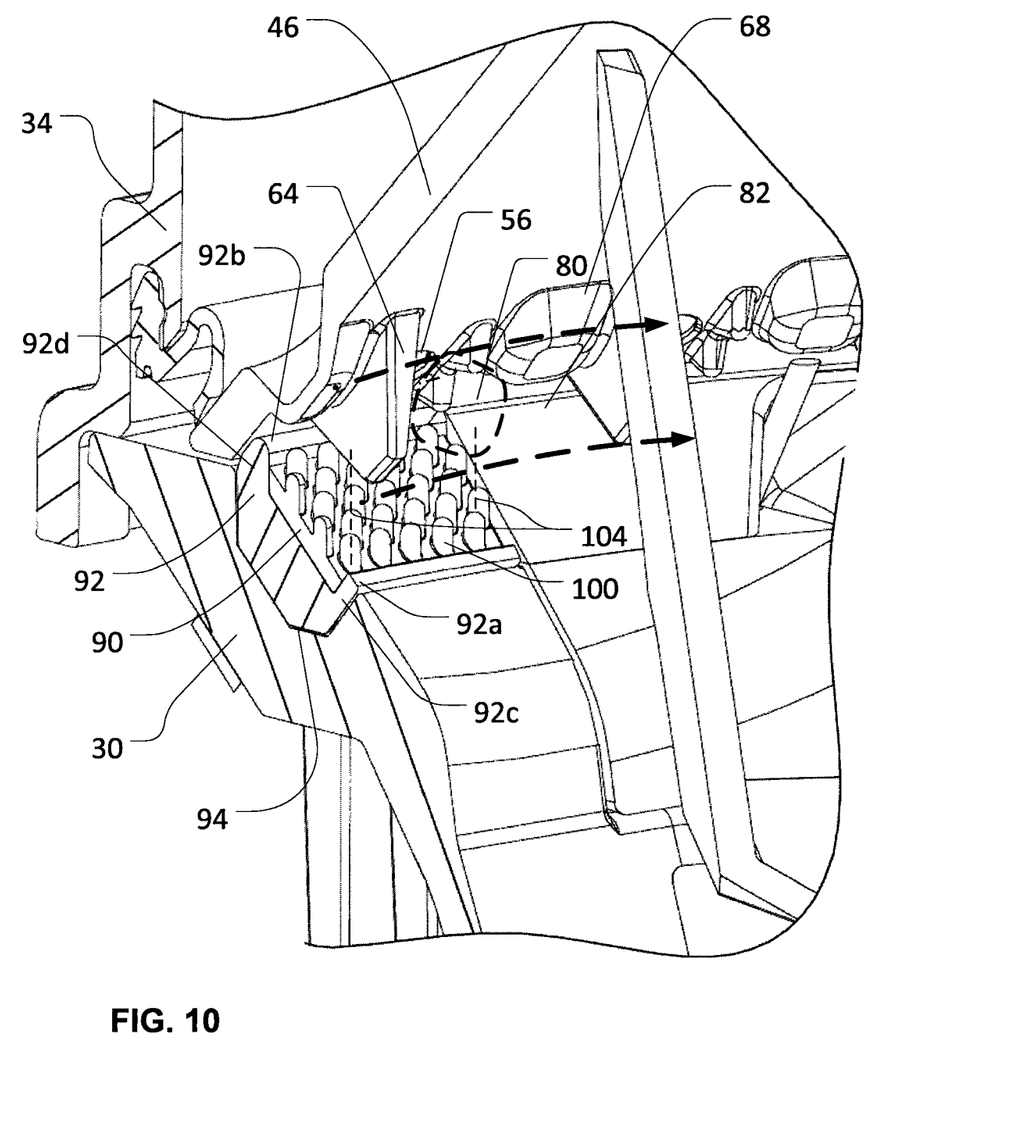
FIG. 10 is a sectional view of the vibration strip depicted in FIG. 9 and various surrounding components, taken along plane A-A of FIG. 9.

Referring also to FIGS. 9 and 10, an example VSDE is depicted having vibration strip 90, which may extend along seed path 82 (indicated by dotted arrows) from a point upstream of seed pool 60 (from the perspective of a seed traveling along seed path 82) to a point downstream of seed pool 60 (again, from the perspective of a seed traveling along seed path 82). Vibration strip 90 may be formed from a variety of materials (e.g., rubber, plastic, metal, composite materials, and so on), and may be monolithic structures configured with various geometries (e.g., as shown in FIGS. 10-15), as discussed in greater detail below.

FIG. 9 provides a perspective that is generally opposite that of FIG. 8A. Accordingly, it will be understood that metering member 46 (not shown in FIG. 9) may oriented such that part of rim portion 54 (with various paddles 64 and apertures 56) may be generally adjacent to vibration strip 90. As such, seed path 82 may also be generally adjacent to vibration strip 90.

As can be seen in FIG. 10, because metering member 46 may carry seed 80 (e.g., by way of paddles 64 and aperture 56) along seed path 82 adjacent to vibration strip 90, seed 80 may come into contact with vibration strip 90 as seed 80 travels along seed path 82. This may cause a corresponding a vibration of seed 80. In the case of a single seed (as depicted in FIG. 10), vacuum force provided via aperture 56 may be sufficient to retain seed 80 on metering member 46 (and within seed path 82) despite the vibration caused by vibration strip 90. In the case of a seed double, however, such as the seed double depicted in FIG. 8B, one or more of seeds 80b, 80c of the seed double may not be as firmly retained between the relevant paddles 64 as a seed that does not form part of a seed double. This may occur, for example, because the crowding of multiple seeds between a set of paddles 64 may result in one or more of the multiple seeds (e.g., seed 80c) not receiving the full retention force that may be provided by aperture 56. Accordingly, when a seed of a seed double is vibrated by vibration strip 90, the seed may be shaken (or otherwise moved) out from between the relevant paddles 64 and thereby fall away from metering member 46 (and back to seed pool 60).

In certain embodiments, aspects of metering member 80 (or other components of planting unit 14) may assist in the vibrational removal of seed-doubles. For example, as also noted above, geometry 68 may tend to cause one seed of a seed-double to be seated near the associated aperture 56, while orienting other seeds of the seed-double away from aperture 56. Because the first seed may experience a stronger retention force with respect to metering member 46 (e.g., due to aperture 56), it may exhibit a stronger tendency to remain on metering member 46 when vibrated than other seeds of the seed double. As such, vibration strip 90 (or other VSDE feature) may tend to leave a single seed from various seed doubles in place on metering member 46.

Vibration strip 90 may be secured with respect to seed path 82 in a variety of ways. In certain embodiments, including as depicted in FIG. 10, vibration strip 90 may be secured to mounting member 92 in various known ways, including with various adhesives, press-fit or other frictional or contact-based securing means, screws or pins, and so on. Mounting member 92, in turn, may then be secured to housing 30 (or another component of planter unit 14) in a variety of ways. (It will be understood that, in certain embodiments, vibration strip 90 and mounting member 92 may also be formed as an integral piece.) In certain embodiments, mounting member 92 may define a particular geometry which may be seated into complementary geometry of recess 94 on the interior of housing 30. Various adhesives, press-fit or other securing means or devices may then secure mounting member 92 within recess 94. In certain embodiments, referring also to FIG. 11, screws, bolts or various other similar connection devices may be utilized to secure mounting member 92 to housing 30. For example, threaded insert or bore 96 may be provided in mounting member 92, with threaded bolt 98 extending through housing 30 and into insert/bore 96 to secure mounting member 92 to housing 30.

Referring again to FIG. 10, in certain embodiments, mounting member 92 (or other components of a VSDE) may be configured with various non-symmetrical geometry. For example, inner exposed edge 92*a* of mounting member 92 may be configured with generally flat geometry (or otherwise), while outer exposed edge 92*b* may be configured with generally curved geometry (or otherwise). Likewise, inner arm 92*c* and outer arm 92*d*, which may cooperatively define a recess for vibration strip 90, may also be configured differently from each other. Inner arm 92*c*, for example, may be generally thinner and shorter than outer arm 92*d*, or otherwise vary in shape or size. Along with various structural functions, and among other benefits, these various configurations may support efficient and effective seed transport, seed vibration, or other functionality, or may facilitate easier assembly of a VSDE, due to various non-symmetries (e.g., with respect to edges 92*a* and 92*b*, or arms 92*c* and 92*d*) or other features providing visual or other cues for alignment and assembly.

Figure 11:
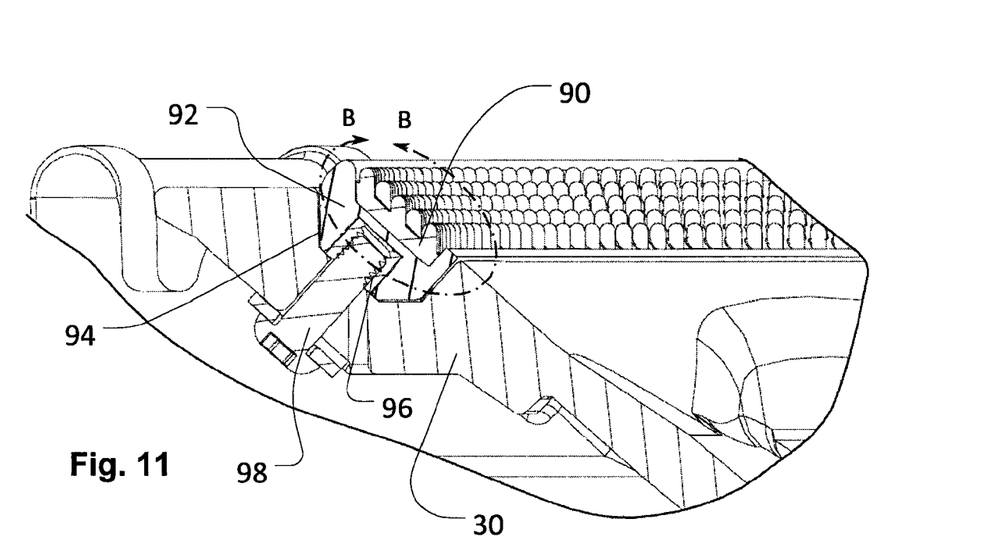
FIG. 11 is an enlarged sectional view of the vibration strip depicted in FIG. 9, including means for mounting the vibration strip to the seed meter.
Figure 12:
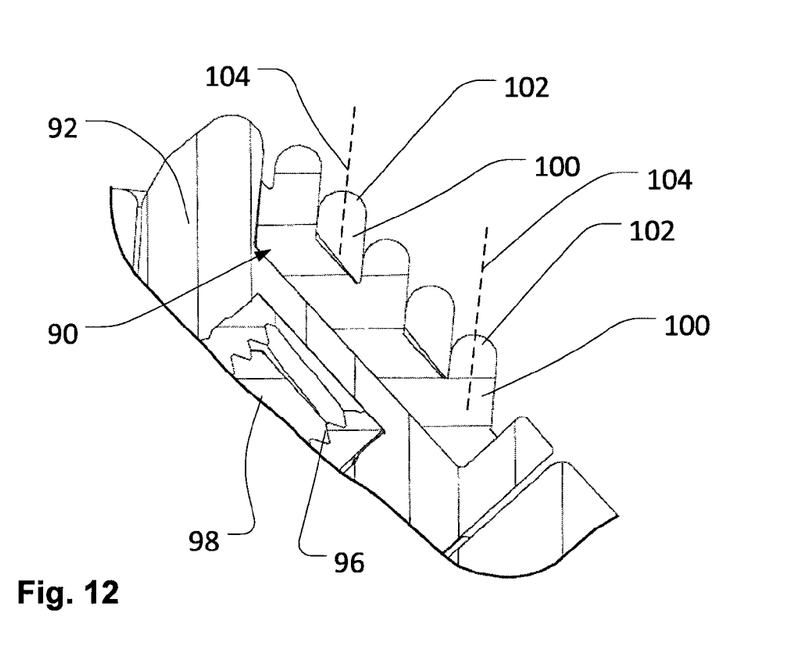
FIG. 12 is an enlarged section view of plane section B-B of FIG. 11.

Referring also to FIGS. 12-15, vibration strip 90 may include a variety of different contours or geometry to cause vibration of seed 80, which may be implemented individually or in various combinations. For example, as depicted in FIG. 12 (and FIGS. 9-11), vibration strip 90 may include various generally cylindrical protrusions 100 with rounded tips 102. In certain embodiments, such protrusions 100 may extend away from housing 30 at an angle such that main axes 104 of various protrusions 100 are directed generally towards metering member 46 or seed path 82. Protrusions 100 (or other geometry of vibration strip 90) may be oriented in a staggered configuration (i.e., with successive rows of protrusions 100 somewhat offset from each other), as depicted in FIGS. 10-12, or in various other ways.

Figure 13:
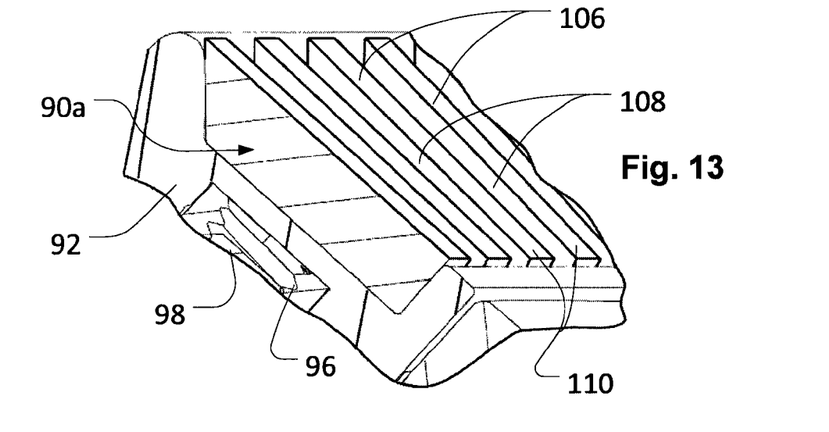
FIGS. 13-15 are enlarged sectional views of various configurations of the vibration strip depicted in FIG. 9, taken from a similar perspective as FIG. 12.

As depicted in FIG. 13, vibration strip 90*a* may include various parallel ridges 106, which may be separated from each other by various parallel gaps 108. Ridges 106 may include generally flat upper surfaces 110 (as depicted in FIG. 13), or may include tapered, curved, pointed, or otherwise contoured upper surfaces 110. Ridges 106 (and gaps 108) may be oriented generally transverse to seed path 82, or may be otherwise angled with respect to seed path 82. Likewise, ridges 106 may be generally flush (or nearly flush) with the adjacent surface of housing 30, or may extend away from that surface (including to varying degrees across the width of vibration strip 90*a*). Ridges 106 may be generally rectangular in cross-section (as depicted in FIG. 13) or may include trapezoidal, triangular, or other cross-sections.

Figures 14, 15:
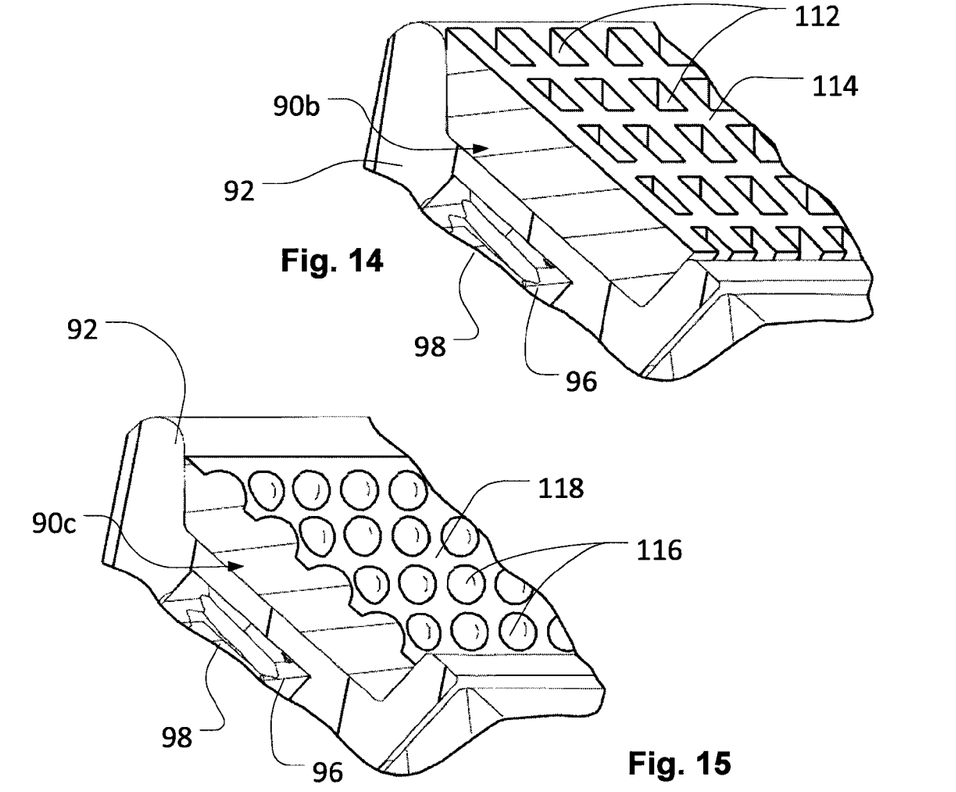

As depicted in FIG. 14, vibration strip 90*b* may include an array of recesses 112, extending into vibration strip 90*b* (and away from seed path 82). As depicted, recesses 112 may be uniformly distributed in a generally rectangular array, with a generally rectangular geometry for the upper opening of each of recesses 112 and a generally rectangular cross-ssection. Other configurations (and combinations thereof) may also be possible, such as non-uniform distribution of recesses 112, distribution of recesses 112 in a non-rectangular (e.g., circular) array, non-rectangular (e.g., round) or non-uniform upper-opening or cross-sectional geometry for each of recesses 112, and so on. Top surface 114 of the array of recesses 112 may be generally flush (or nearly flush) with the adjacent surface of housing 30, or may extend away from that surface (including to varying degrees across the width of vibration strip 90*b*).

As depicted in FIG. 15, in certain embodiments, vibration strip 90*c* may include various rounded (but non-cylindrical) protrusions 116. As with regard to protrusions 100, for example, protrusions 116 may be arranged in a staggered, or other, configuration, may exhibit various heights away from upper surface 118 of vibration strip 90*c*, various characteristic diameters or other dimensions, various cross-sectional profiles, various spacing between protrusions 116, and so on.

In certain embodiments, various aspects of the geometry of different vibration strips 90 (and various features included thereon) may be selected based upon various characteristics of seed 80. For example, using various known techniques, it may be possible to identify an average of nominal diameter (or other size) of seed 80. Various aspects of a particular vibration strip 90 may then be based upon such a diameter (or other size). In certain embodiments, in order to ensure that seed 80 may not be trapped by protrusions (or other geometry) of vibration strip 90, it may be desirable to provide for a separation between various protrusions of vibration strip 90 that is generally less than the average diameter of seed 80. For example, the spacing between individual protrusions 100 or rows of protrusions 100 may be configured to be less than an average seed diameter, in order to avoid seed 80 becoming lodged between protrusions 100. Likewise, the distance between ridges 106 across gaps 108, or the width of recesses 112, may be configured to be less than an average seed diameter, in order to avoid seed 80 becoming lodged within gaps 108 or recesses 112.

In this light, it may be viewed as useful to configure certain embodiments of vibration strip 90 to be easily removable from mounting member 92 (e.g., via release of a press-fit connection or releasable adhesive), as this may allow for easy utilization of various strips 90 depending on the characteristics of seed 80. For example, one configuration of vibration strip 90 may be particularly suitable for wheat seed, while a different configuration of vibration strip 90 may be particularly suitable for corn.

It will be understood that various configurations other than those explicitly depicted in the figures may also be possible. Vibration strip 90, for example, may extend a different distance upstream or downstream of seed pool 60 than is depicted in FIG. 9, may not extend into seed pool 60 at all, or may not extend out of seed pool 60 at all (in either or both directions). In certain embodiments, vibration strip 90 may be integrally formed with mounting member 92 or with housing 30, or may be mounted directly to housing 30 (i.e., without a distinct, intervening mounting member). Likewise, the width of vibration strip 90 (from a perspective transverse to seed path 82) may take various dimensions and may, in certain embodiments, vary along seed path 82. Further, vibration strip 90 may include various contours or geometry to vibrate seed 80 other than those explicitly depicted.

In certain embodiments, electro-mechanical (or other) means may be provided to actively introduce vibration to seeds 80. Referring again to FIG. 9, for example, electromechanical device 120 may be in communication with vibration strip 90 (or another component of a VSDE). Device 120, for example, may be a motor rotating a non-symmetrical weighted member, a reciprocating linear actuator, or other device for creating or inducing vibration. Because device 120 may be in communication with vibration strip 90 (or another component of a VSDE), activating device 120 may impart vibrational movement to vibration strip 90 (or the other component). This, in turn, may impart vibrational movement to seed 80 traveling along seed path 82. Device 120 may be powered, activated, de-activated, and otherwise controlled in various known ways. For example, a control circuit (not shown) may be provided to automatically activate device 120 when metering member 46 is rotating, when a particular level of seed has accumulated in seed pool 60, when an operator provides a selection indicating desire to activate device 120, and so on.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A vibrational seed-double eliminator member for a seeding machine that is configured to move seed along a seed path from a seed pool to a release position, the vibrational seed-double eliminator comprising:
a monolithic vibration strip extending along the seed path along the seed pool, the vibration strip including a seed-contact portion configured to maintain spaced-apart surfaces adjacent to the seed path;
wherein as the seed is moved by the seeding machine along the seed path, the seed-contact portion of the vibration strip causes the seed to vibrate, thereby removing from the seed path one or more seeds of a seed double.

2. The vibrational seed-double eliminator of claim 1, wherein the vibration strip is fixed with respect to the seed path.

3. The vibrational seed-double eliminator of claim 1, wherein the seed-contact portion of the vibration strip includes a plurality of protrusions extending from the vibrational seed-double eliminator into the seed path.

4. The vibrational seed-double eliminator of claim 3, wherein at least first and second protrusions of the plurality of protrusions are separated by a distance less than an average diameter of the seed.

5. The vibrational seed-double eliminator of claim 3, wherein the plurality of protrusions includes a plurality of rounded protrusions.

6. The vibrational seed-double eliminator of claim 3, wherein the plurality of protrusions includes a plurality of generally cylindrical protrusions with rounded tips extending into the seed path.

7. The vibrational seed-double eliminator of claim 1, wherein the seed-contact portion of the vibration strip includes a series of parallel ridges extending into the seed path.

8. The vibrational seed-double eliminator of claim 7, wherein the parallel ridges are oriented transverse to the seed path.

9. The vibrational seed-double eliminator of claim 7, wherein the parallel ridges are separated by a series of parallel gaps, one or more of which has a width that is less than an average diameter of the seed.

10. The vibrational seed-double eliminator of claim 1, wherein the seed-contact portion of the vibration strip includes an array of recesses extending into the vibration strip and away from the seed path.

11. The vibrational seed-double eliminator of claim 1, further comprising: an automated vibration device in communication with the vibration strip, the automated vibration device imparting vibrational motion to a portion of the vibration strip as the seed is moved by the seeding machine along the seed path.

12. A planting unit for a seeding machine comprising:
a seed meter having a metering member that moves seed individually and sequentially along a seed path from a seed pool to a release position; and
a monolithic vibration strip extending along the seed path along the seed pool, the vibration strip including a seed-contact portion configured to maintain spaced-apart surfaces adjacent to the seed path;

wherein as the seed is moved by the metering member along the seed path, contact between the seed-contact portion of the vibration strip and the seed causes the seed to vibrate, thereby removing from the seed path one or more seeds of a seed double.

13. The planting unit of claim 12, wherein the seed-contact portion of the vibration strip includes a plurality of protrusions extending into the seed path.

14. The planting unit of claim 13, wherein first and second protrusions in the plurality of protrusions are separated by a distance less than an average diameter of the seed.

15. The planting unit of claim 13, wherein the plurality of protrusions includes a plurality of rounded protrusions.

16. The planting unit of claim 13, wherein the plurality of protrusions includes a plurality of generally cylindrical protrusions with rounded tips extending into the seed path.

17. The planting unit of claim 13, wherein the seed-contact portion of the vibration strip includes a series of parallel ridges extending into the seed path.

18. The planting unit of claim 17, wherein the parallel ridges are separated by a series of parallel gaps, one or more of which has a width that is less than an average diameter of the seed.

19. The planting unit of claim 12, wherein the seed-contact portion of the vibration strip includes an array of recesses extending into the vibration strip and away from the seed path.

20. The planting unit of claim 12, further comprising: an automated vibration device in communication with the vibration strip, the automated vibration device imparting vibrational motion to a portion of the vibration strip as the seed is moved by the metering member along the seed path.

* * * * *